US012606780B2

(12) United States Patent
Janssen et al.

(10) Patent No.: US 12,606,780 B2
(45) **Date of Patent: *Apr. 21, 2026**

(54) SOLUBLE LAUNDRY DETERGENT SHEETS WITH ACRYLAMIDE POLYMERS

(71) Applicant: Henkel AG & Co. KGaA, Duesseldorf (DE)

(72) Inventors: Frank Janssen, Cologne (DE); David Matulla, Hilden (DE); Dorothea Kapitza, Duesseldorf (DE); Susanne Schneider, Duesseldorf (DE); Birgit Scheffers, Duesseldorf (DE); Beate Seebauer, Langenfeld (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 890 days.

This patent is subject to a terminal disclaimer.

(21) Appl. No.: 17/234,722

(22) Filed: Apr. 19, 2021

(65) Prior Publication Data

US 2021/0238516 A1 Aug. 5, 2021

Related U.S. Application Data

(63) Continuation of application No. PCT/EP2019/078263, filed on Oct. 17, 2019.

(30) Foreign Application Priority Data

Oct. 19, 2018 (DE) ..................... 10 2018 217 950.6

(51) Int. Cl.

| | |
|---|---|
| ***C11D 17/06*** | (2006.01) |
| ***C11D 1/29*** | (2006.01) |
| ***C11D 1/72*** | (2006.01) |
| ***C11D 3/22*** | (2006.01) |
| ***C11D 3/37*** | (2006.01) |
| ***C11D 3/386*** | (2006.01) |
| ***C11D 3/50*** | (2006.01) |
| ***C11D 11/00*** | (2006.01) |

(52) U.S. Cl.

CPC ................ *C11D 17/06* (2013.01); *C11D 1/29* (2013.01); *C11D 1/72* (2013.01); *C11D 3/222* (2013.01); *C11D 3/3723* (2013.01); *C11D 3/3753* (2013.01); *C11D 3/3769* (2013.01); *C11D 3/386* (2013.01); *C11D 3/50* (2013.01); *C11D 11/0082* (2013.01); *C11D 2111/12* (2024.01)

(58) Field of Classification Search

CPC ....... C11D 17/06; C11D 3/222; C11D 3/3753; C11D 1/72

See application file for complete search history.

(56) References Cited

U.S. PATENT DOCUMENTS

| | | | | |
|---|---|---|---|---|
| 5,863,887 A | | 1/1999 | Gillette | |
| 6,261,368 B1 | * | 7/2001 | Wight | B05C 11/042 118/410 |
| 6,699,826 B1 | * | 3/2004 | Saijo | C11D 3/3942 510/438 |
| 6,818,606 B1 | * | 11/2004 | Hanada | C11D 17/06 510/296 |
| 11,434,586 B2 | * | 9/2022 | Gordon | C11D 17/042 |
| 2012/0053108 A1 | * | 3/2012 | Glenn, Jr. | B08B 9/20 510/298 |
| 2015/0218497 A1 | * | 8/2015 | Jalbert | B29C 41/26 118/68 |
| 2016/0130528 A1 | * | 5/2016 | Si | C11D 3/373 510/347 |
| 2017/0335237 A1 | * | 11/2017 | Fossum | C11D 1/83 |
| 2018/0223229 A1 | * | 8/2018 | Tan | C11D 3/222 |
| 2018/0223230 A1 | * | 8/2018 | Tan | C11D 3/3707 |
| 2019/0282466 A1 | * | 9/2019 | Oh | C11D 17/0039 |
| 2020/0010784 A1 | * | 1/2020 | Cho | C11D 3/386 |
| 2020/0224128 A1 | * | 7/2020 | Crutcher, Jr. | C11D 3/3769 |
| 2021/0238514 A1 | * | 8/2021 | Janssen | C11D 3/22 |
| 2021/0238515 A1 | * | 8/2021 | Janssen | C11D 3/507 |
| 2021/0238516 A1 | * | 8/2021 | Janssen | C11D 3/3769 |

FOREIGN PATENT DOCUMENTS

| | | | | |
|---|---|---|---|---|
| CA | 3008787 A1 | | 6/2017 | |
| WO | WO-2012003367 A2 | * | 1/2012 | A61K 8/0204 |
| WO | WO-2018040412 A1 | * | 3/2018 | |

OTHER PUBLICATIONS

Fischer, Karl, "Neues Verfahren zur massanalytischen Bestimmung des Wassergehaltes von Fluessigkeiten und festen Koerpern", Angewandte Chemie 1935, 48, 394-396; ISBN 3-540-12846-8 Eugen Scholz.

PCT International Search Report & Written Opinion PCT/EP2019/078263 Completed: Jan. 7, 2020; Mailing Date: Jan. 16, 2020 14 pages.

* cited by examiner

*Primary Examiner* — Mark Eashoo
*Assistant Examiner* — M. Reza Asdjodi
(74) *Attorney, Agent, or Firm* — Blank Rome LLP

(57) ABSTRACT

A method for manufacturing a water-soluble laundry detergent sheet from a liquid composition including the following components: (a) at least one acrylamide polymer, (b) at least one surfactant, (c) at least one water-soluble polymer, (d) optionally at least one washing booster, (e) optionally at least one perfume component, and (f) optionally at least one adjunct detergent ingredient. Also encompassed are the water-soluble laundry detergent sheets obtainable by the method and the use thereof for cleaning textiles and in methods for cleaning textiles.

18 Claims, No Drawings

SOLUBLE LAUNDRY DETERGENT SHEETS WITH ACRYLAMIDE POLYMERS

FIELD OF THE INVENTION

The present invention relates to a method for manufacturing a water-soluble laundry detergent sheet from a liquid composition comprising the following components: (a) at least one acrylamide polymer, (b) at least one surfactant, (c) at least one water-soluble polymer, (d) optionally at least one washing booster, (e) optionally at least one perfume component, and (f) optionally at least one adjunct detergent ingredient. Also encompassed are the water-soluble laundry detergent sheets obtainable by said method and the use thereof for cleaning textiles and in methods for cleaning textiles.

BACKGROUND OF THE INVENTION

Customers prefer laundry and cleaning products which are easy to handle, sustainable, small and compact. Due to changes in customers' buying behavior, laundry detergents having a reduced package size are becoming more and more preferred. The higher demand for such products is partly due to the increasing importance of home delivery products. Furthermore, simple dosing and cleaning properties similar or even improved compared to those of conventional products are desired. The present invention aims at providing products which can meet one or more of the above-mentioned needs.

BRIEF SUMMARY OF THE INVENTION

The inventors of the present invention surprisingly found that at least some of the above needs are met by a laundry detergent sheet obtainable by the methods of the present invention. Even more surprisingly, it was found that the at least one acrylamide polymer contained in the laundry detergent sheet provides washed textiles with a smooth surface.

In a first aspect the invention therefore relates to a method for manufacturing a water-soluble laundry detergent sheet, the method comprising, consisting essentially of or consisting of the steps:

- (i) providing an aqueous liquid, preferably homogenous, composition comprising, consisting essentially of or consisting of the following components:
  - (a) at least one acrylamide polymer,
  - (b) at least one surfactant,
  - (c) at least one water-soluble polymer,
  - (d) optionally at least one washing booster
  - (e) optionally at least one perfume component, and
  - (f) optionally at least one adjunct detergent ingredient;
- (ii) applying the composition of step (i) onto a surface such that it forms a layer on said surface;
- (iii) drying said layer to obtain a laundry detergent sheet; and
- (iv) optionally cutting the laundry detergent sheet into pieces of a desired shape and size; and
- (v) optionally packaging one or more laundry detergent sheets obtained in step (iv).

In a second aspect, the invention refers to a laundry detergent sheet obtainable by the method according to the present invention.

In a third aspect, the invention also encompasses the use of a laundry detergent sheet according to the present invention for cleaning textiles.

Still another aspect is directed to methods for cleaning textiles, wherein said methods comprise the use of the laundry detergent sheets of the invention.

"At least one", as used herein, relates to one or more, i.e. 1, 2, 3, 4, 5, 6, 7, 8, 9, or more. If used in combination with a compound or component, the term does not relate to the absolute number of molecules but rather to the number of different types of said compound or component. "At least one acrylamide polymer" thus means that at least one type, but that also 2 or more different types of acrylamide polymers can be present in the composition.

"Consists essentially of", as used herein, means that the respective composition comprises at least 50 wt.-%, preferably at least 70 wt.-%, more preferably at least 80 wt.-% of the given components. The residual amount may be made up by non-specified further ingredients. It may be preferred that these further ingredients do not comprise active ingredients.

If not indicated otherwise, all percentages are by weight relative to the total weight of the composition. "About" or "approx.", as used herein in relation to a numerical value, means said value+10%, preferably +5%. If a numerical value is given without any decimal place, such as "99%", this refers to "99.0%", if not indicated otherwise.

The term "sheet", as used herein, relates to a specific form of a solid laundry detergent composition that is characterized by its 3-dimensional shape in that its thickness is small compared to its length and breadth. The term typically relates to rectangular forms but is not limited to those.

All percentages disclosed herein relate, if not indicated otherwise, to % by weight relative to the total weight of the respective composition. If the composition is not defined otherwise, the term relates to the laundry detergent sheet after the drying step.

These and other aspects, features and advantages of the invention become apparent to the skilled person in the following detailed description and claims. Each feature from one aspect of the invention can be used in any other aspect of the invention. Furthermore, the examples contained herein are intended to describe and illustrate the invention, but do not restrict it. In particular, the invention is not limited to these examples.

DETAILED DESCRIPTION OF THE INVENTION

In various embodiments, the present invention pertains to a method for manufacturing a water-soluble laundry detergent sheet, comprising or consisting of the steps:

- (i) providing an aqueous liquid, preferably homogenous, composition comprising or consisting of the following components:
  - (a) at least one acrylamide polymer,
  - (b) at least one surfactant,
  - (c) at least one water-soluble polymer,
  - (d) at least one washing booster,
  - (e) optionally at least one perfume component, and
  - (f) optionally at least one adjunct detergent ingredient;
- (ii) applying the composition of step (i) onto a surface such that it forms a layer on said surface;
- (iii) drying said layer to obtain a laundry detergent sheet; and
- (iv) optionally cutting the laundry detergent sheet into pieces of a desired shape and size; and
- (v) optionally packaging one or more laundry detergent sheets obtained in step (iv).

The at least one acrylamide polymer of the present invention is preferably selected from the group consisting of 2-propionic acid polymer with 2-propenamide, minimum number average molecular weight (in amu) 18,000 or N,N-dimethyl-N-2-propenyl-2-propene-1-aminium chloride (dimethyl diallyl ammonium chloride) and/or 2-propenamide polymer with N,N,N-trimethyl-3-[(1-oxo-2-propenyl) amino]-1-propanaminium chloride ((3-acrylamidopropyl) trimethylammonium chloride) and/or polymer with sodium 2-propenoate. Typical amounts of the at least one acrylamide polymer range from 0.1 to 20 wt.-%, preferably of from 0.1 to 10 wt.-%, based on the total weight of the composition.

The at least one surfactant is different from the acrylamide polymer of the present invention. The at least one surfactant may be a detersive surfactant selected from the group consisting of anionic, cationic, non-ionic, zwitterionic and amphoteric surfactants as well as combinations thereof. Typical amounts of the at least one surfactant range from 10 to 90 wt.-%, preferably from 25 to 70 wt.-%, based on the total weight of the composition. The amount refers to the total amount of surfactants in the composition.

In another preferred embodiment, the composition contains a mixture of surfactants of the same or different type of surfactants, more preferably a mixture of 2, 3, 4, 5 or more surfactants of the same type or of different types of surfactants, selected from the group consisting of anionic, cationic, non-ionic and amphoteric surfactants.

In various embodiments, the detersive surfactant comprises anionic detersive surfactant. Suitable anionic detersive surfactants are alkoxylated alcohol sulfate anionic detersive surfactants such as linear or branched, substituted or unsubstituted ethoxylated C12-18 alcohol sulfates having an average degree of ethoxylation of from 1 to 10, preferably from 3 to 7. Other suitable anionic detersive surfactant are alkyl benzene sulfonate anionic detersive surfactants such as linear or branched, substituted or unsubstituted C8-18 alkyl benzene sulfonates, preferably linear unsubstituted C10-13 alkyl benzene sulfonates. Other suitable anionic detersive surfactants are alkyl sulfates, alkyl sulfonates, alkyl carboxylates or any mixture thereof.

In various embodiments, the detersive surfactant comprises at least one alkyl benzene sulfonate. Examples of suitable alkyl benzene sulfonates include but are not limited to linear and branched alkyl benzene sulfonates, preferably linear alkyl benzene sulfonates. Exemplary compounds are those of formula (I)

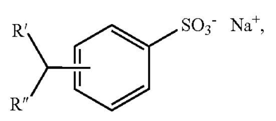

(I)

wherein R' and R" are independently H or alkyl and combined comprise 9 to 19, preferably 9 to 15 and more preferably 9 to 13 carbon atoms. Particularly preferred are dodecyl and tridecyl benzene sulfonates, in particular the sodium salts thereof. While reference is made herein to the sulfonates and particularly the sodium salts thereof, it is understood that the invention also encompasses salts with other metals, ammonium or organic bases, such as alkanolamines. Further, it is understood that also the free acid forms, also referred to as "acidic precursors" may be used.

The detersive anionic surfactant may further or alternatively comprise at least one alkyl ether sulfate. Preferred alkyl ether sulfates are those of formula (II)

$$R^1—O—(AO)_n—SO_3^-X^+ \quad (II).$$

In formula (II) $R^1$ represents a linear or branched, substituted or unsubstituted alkyl group, preferably a linear, unsubstituted alkyl group, more preferably a fatty alcohol moiety. Preferred $R^1$ moieties are selected from the group consisting of decyl, undecyl, dodecyl, tridecyl, tetradecyl, pentadecyl, hexadecyl, heptadecyl, octadecyl, nonadecyl, eicosyl moieties and mixtures thereof, wherein those groups with an even number of carbon atoms are preferred. Particularly preferred $R^1$ moieties are derived from $C_{10}$-$C_{18}$ fatty alcohols, such as those derived from coconut oil alcohols, tallow fatty alcohols, lauryl, myristyl, cetyl or stearyl alcohol or from $C_{10}$-$C_{20}$ oxoalcohols. AO represents an ethylene oxide (EO) or propylene oxide (PO) group, preferably an ethylene oxide group. The index n represents an integer from 1 to 50, preferably from 1 to 20 and more preferably from 1 to 10. Particularly preferably, n is 1, 2, 3, 4, 5, 6, 7 or 8. X represents a monovalent cation or the n-th part of an n-valent cation, preferred are alkali metal cations, specifically $Na^+$ and $K^+$, most preferably $Na^+$. Further cations $X^+$ may be selected from $NH_4$+, ½ $Zn^{2+}$, ½ $Mg^{2+}$, ½ $Ca^{2+}$, ½ $Mn^{2+}$, and combinations thereof.

In various embodiments, the detersive surfactants comprise an alkyl ether sulfate selected from fatty alcohol ether sulfates of formula (III)

(III)

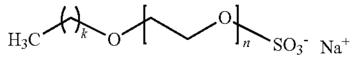

wherein k=9 to 19, and n=1, 2, 3, 4, 5, 6, 7 or 8. Preferred are $C_{10-16}$ fatty alcohol ether sulfates with 1-7, more preferably 1-3 EO (k=9-15, n=1-7, 1-3), even more preferred the $C_{12-14}$ fatty alcohol ether sulfates with 1-3, particularly 2 EO (k=11-13, n=1-3 or 2). The level of ethoxylation is an average value and can, for a specific compound, be an integer or fractional number.

The detersive surfactant may also comprise non-ionic detersive surfactants. Suitable non-ionic detersive surfactants are selected from: $C_{8-18}$ alkyl alkoxylated alcohols having an average degree of alkoxylation of from 1 to 20, preferably from 3 to 10, most preferred are $C_{12-18}$ alkyl ethoxylated alcohols having an average degree of alkoxylation of from 3 to 10; and mixtures thereof.

Suitable nonionic surfactants are those of formula (IV)

$$R^2—O—(AO)_m—H \quad (IV),$$

wherein $R^2$ represents a linear or branched substituted or unsubstituted alkyl moiety, AO represents an ethylene oxide (EO) or propylene oxide (PO) group and m is an integer from 1 to 50. In formula (IV) $R^2$ preferably represents a linear or branched, substituted or unsubstited alkyl group, preferably a linear, unsubstituted alkyl group, particularly preferred a fatty alcohol group. Preferred groups represented by $R^2$ are selected from decyl, undecyl, dodecyl, tridecyl, tetradecyl, pentadecyl, hexadecyl, heptadecyl, octadecyl, nonadecyl, eicosyl groups and combinations thereof, wherein those groups with an even number of carbon atoms are preferred. Particularly preferred are $R^2$ groups derived from $C_{12}$-$C_{18}$ fatty alcohols, such as coconut oil alcohol, tallow oil alcohol, lauryl, myristyl, cetyl or stearyl alcohol or from $C_{10}$-$C_{20}$ oxoalcohols. AO represents an ethylene oxide (EO) or propylene oxide (PO) group, preferably an ethylene oxide group. The index m represents an integer from 1 to 50, preferably from 1 to 20 and more preferably from 3 to 10. Particularly preferably, m is 3, 4, 5, 6 or 7.

In various embodiments, the detergent compositions comprise an alkyl ether selected from fatty alcohol ethers of formula (V)

(V)

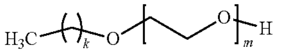

wherein k=11 to 19, m=3, 4, 5, 6 or 7. Preferred are $C_{12}$-18 fatty alcohols with 3-7 EO (k=11-17, m=3-7 in formula (V)).

The detergents may further include other nonionic surfactants, such as alkyl glucosides of the general formula $RO(G)_x$, where R is a primary linear or 2-methyl-branched aliphatic radical containing 8 to 22 and preferably 12 to 18 carbon atoms and G stands for a glucose unit. The degree of oligomerization x, which indicates the distribution of monoglucosides and oligoglucosides, is a number of from 1 to 10 and preferably a number of from 1.2 to 1.4.

In various embodiments, the detersive surfactant comprises at least two anionic surfactants, namely at least one alkyl ether sulfate and preferably at last one alkyl benzene sulfonate, and optionally an alkyl ether.

The detersive surfactant may also comprise cationic detersive surfactants. Cationic surfactants are preferably selected from esterquats and/or quaternary ammonium compounds (QACs) of the general formula $(R^I)$ $(R^{II})$ $(R^{III})$ $(R^{IV})$ $N^+$ $X^-$, in which $R^I$ to $R^{IV}$ are identical or different $C_1$-22 alkyl groups, $C_7$-28 aryl groups or heterocyclic groups, wherein two or, in the case of an aromatic incorporation as in pyridine, even three groups, form a heterocycle together with the nitrogen atom, for example a pyridinium or imidazolinium compound, and X− denotes halide ions, sulfate ions, hydroxide ions or similar anions. QACs can be prepared by reacting tertiary amines with alkylating agents, such as methyl chloride, benzyl chloride, dimethyl sulfate, dodecyl bromide, but also ethylene oxide. The alkylation of tertiary amines having one long alkyl group and two methyl groups is particularly easy, and the quaternization of tertiary amines having two long groups and one methyl group can also be carried out with the aid of methyl chloride under mild conditions. Amines which have three long alkyl groups or hydroxy-substituted alkyl groups lack reactivity and are, for example, quaternized with dimethyl sulfate. Suitable QACs are, for example, benzalkonium chloride (N-alkyl N,N-dimethyl benzyl ammonium chloride), benzalkone B (m,p-dichloro benzyl dimethyl-C12-alkyl ammonium chloride, benzoxonium chloride (benzyl-dodecyl-bis-(2-hydroxyethyl) ammonium chloride), cetrimonium bromide (N-hexadecyl-N,N-trimethyl ammonium bromide), benzetonium chloride (N,N-dimethyl-N [2-[2-[p-(1,1,3,3-tetramethylbutyl) phenoxy] ethoxy]ethyl] benzyl ammonium chloride), dialkyldimethylammonium chlorides, such as di-n-decyldimethylammonium chloride, didecyldimethylammonium bromide, dioctyldimethylammonium chloride, 1-cetylpyridinium chloride, and thiazoline iodide, as well as mixtures thereof. Preferred QACs are the benzalkonium chlorides having $C_8$-22 alkyl residues, in particular $C_{12}$-$C_{14}$ alkylbenzyldimethylammonium chloride. Preferred esterquats are methyl-N-(2-hydroxyethyl)-N,N-di (tallow-acyl-oxyethyl) ammonium methosulfate, bis (palmitoyl) ethyl hydroxyethyl methylammonium methosulfate or methyl-N,N-bis (acyloxyethyl)-N-(2-hydroxyethyl) ammonium methosulfate. Commercially available examples are methyl hydroxyalkyl dialkoyloxyalkylammonium methosulfates commercially available from Stepan under the trademark Stepantex® or the products from BASF SE known by the trade name Dehyquart® or the products from Evonik Industries AG known by the trade name Rewoquat®.

Suitable amphoteric/zwitterionic surfactants include amine oxides and betaines.

The at least one water-soluble polymer is different from the acrylamide polymers, washing booster, and surfactants of the present invention and is, in various embodiments, selected from the group consisting of polyvinyl alcohol (PVA), polyethylene glycol (PEG), starch, cellulose, pullulan, xanthan, guar, carrageenan, polyacrylate, and gelatin, preferably from polyvinyl alcohol, and starch.

In one preferred embodiment, the composition contains only one water-soluble polymer selected from the group consisting of polyvinyl alcohol (PVA), polyethylene glycol (PEG), starch, cellulose, pullulan, xanthan, guar, carrageenan, polyacrylate, and gelatin, more preferably from polyvinyl alcohol, and starch.

In another preferred embodiment, the composition contains a mixture of water-soluble polymers of the same or different type of water-soluble polymers, more preferably a mixture of 2, 3, 4, 5 or more water-soluble polymers of the same type or of different types of water-soluble polymers, selected from the group consisting of polyvinyl alcohol (PVA), polyethylene glycol (PEG), starch, cellulose, pullulan, xanthan, guar, carrageenan, polyacrylate, and gelatin, more preferably from polyvinyl alcohol and starch.

Generally, the at least one water-soluble polymer may be contained in the composition in amounts of from 1 to 80 wt.-%, preferably in amounts of from 10 to 50 wt.-%, more preferably in amounts of from 10 to 30 wt.-%, based on the total weight of the composition.

In a preferred embodiment, the at least one water-soluble polymer selected from the group consisting of polyvinyl alcohol (PVA), polyethylene glycol (PEG), starch, cellulose, pullulan, xanthan, guar, carrageenan, polyacrylate, and gelatin, more preferably from polyvinyl alcohol, and starch, is preferably contained in the composition in an amount of from 1 to 80 wt.-%, more preferably in an amount of from 10 to 50 wt.-%, more preferably in an amount of from 10 to 30 wt.-%, based on the total weight of the composition. The amount refers to the total amount of water-soluble polymers in the composition.

Preferably, polyvinyl alcohol is contained in the composition, more preferably in an amount of from 1 to 80 wt.-%, more preferably in an amount of from 10 to 30 wt.-%, based on the total weight of the composition.

In a further preferred embodiment, starch is contained in the composition, more preferably in an amount of from 1 to 80 wt.-%, more preferably in an amount of from 10 to 50 wt.-%, based on the total weight of the composition.

In another preferred embodiment, polyvinyl alcohol and starch are contained in the composition, more preferably in an amount of from 1 to 80 wt.-%, based on the total weight of the composition.

Furthermore, the composition according to the invention preferably contains at least one washing booster. The at least one washing booster may, in various embodiments, be selected from the group consisting of enzymes and polyalkyleneimines as well as combinations thereof. The washing booster is different form the acrylamide polymers, surfactants and water-soluble polymers of the present invention.

The enzymes may be selected from the types of enzymes commonly used in laundry detergents, including amylases, proteases, lipases, carbohydrases, cellulases, laccases, oxidases, peroxidases, pectate lyases, xanthanases, licheninases and mannanases. Preferably, the enzymes include at least one, preferably two or more of mannanase, xanthanase, licheninase, protease, amylase, cellulase and lipase. Preferred are enzymes of bacterial or fungal origins that have been adapted or modified for use in detergent applications. Suitable enzymes are widely known in the field and commercially available.

In a preferred embodiment, the at least one washing booster is at least one enzyme, preferably selected from the group of mannanase, xanthanase, and licheninase.

In case the at least one washing booster comprises or is an enzyme or a combination of enzymes, said enzymes are preferably contained in the composition in amounts of from 0.0001 to 10 wt.-%, more preferably in amounts of from 0.001 to 5 wt.-%, based on the total weight of the composition. The amounts given relate to active protein.

The enzymes may be used in pre-formulated form, typically in form of enzyme preparations that may comprise in addition to the enzymes at least one stabilizer and various auxiliaries. Such enzyme formulations typically comprise up to 50% by weight of the active enzyme.

Suitable polyalkyleneimines are known in the art and comprise polyethyleneimines and alkoxylated variants thereof. Alkoxylated polyalkyleneimines have a polyalkyleneimine core with one or more alkoxy side chains bonded to at least one nitrogen atom in the polyalkyleneimine core. Preferred are ethoxylated or propoxylated polyalkyleneimines, in particular ethoxylated polyalkyleneimines, more preferable ethoxylated polyethyleneimines.

The average number molecular weight of suitable polyalkyleneimines and alkoxylated variants thereof typically ranges from about 100 to 100,000 Daltons.

Suitable alkoxylated polyalkyleneimines, such as PEI600 EO20, are commercially available, for example from BASF (Ludwigshafen, Germany).

If the washing booster comprises or is a polyalkyleneimine, it is preferably contained in the composition in amounts of from 0.01 to 40 wt.-%, more preferably in amounts of from 0.1 to 30 wt.-%, based on the total weight of the composition.

In various embodiment, the composition contains only one washing booster selected from the group consisting of enzymes and polyalkylene imines. It may however be preferred that the composition comprises a combination of two or more washing boosters, more preferably a combination of 2, 3, 4, 5 or more different compounds or types of washing boosters, selected from the group consisting of enzymes, polyalkyleneimines and combinations thereof. It may for example be preferred if the composition comprises at least one protease and at least one polyalkyleneimine, preferably a polyethyleneimine or alkoxylated variant thereof. Optionally, it may contain one or more further enzymes, such as amylases, lipases and cellulases.

Furthermore, the composition according to the invention preferably contains at least one perfume component. The at least one perfume component can preferably be of natural or synthetic origin, e.g. selected from esters, ethers, aldehydes, ketones, alcohols and hydrocarbons, as well as perfume oils.

Perfume components of the ester type include, for example, benzyl acetate, phenoxyethyl isobutyrate, p-tert-butylcyclohexyl acetate, linalyl acetate, dimethylbenzylcarbinyl acetate (DMBCA), phenylethyl acetate, benzyl acetate, ethylmethyl phenyl glycinate, allylcyclohexyl propionate, styrallyl propionate, benzyl salicylate, cyclohexylsalicylate, floramat, melusat and jasmacyclate. The ethers include, for example, benzylethylether and ambroxan; the aldehydes include, for example, the linear alkanals with 8 to 18 carbon atoms, citral, citronellal, citronellyl oxyacetaldehyde, cyclamenaldehyde, lilial and bourgeonal; the ketones include, for example, the ionones, a-isomethylionone and methyl cedryl ketone; the alcohols include, for example, anethole, citronellol, eugenol, geraniol, linalool, phenylethyl alcohol and terpineol; the hydrocarbons include mainly terpenes such as limonene and pinene. However, mixtures of various perfume components which jointly produce a pleasant scent note are preferred.

Such perfume components may also contain mixtures of natural perfume substances such as those accessible from plant sources, e.g., pine oil, citrus oil, jasmine oil, patchouli oil, rose oil or ylang-ylang oil. Also suitable are muscatel sage oil, chamomile oil, clove oil, lemon balm oil, mint oil, cinnamon leaf oil, linden blossom oil, juniper berry oil, vetiver oil, olibanum oil, *galbanum* oil and labdanum oil as well as orange blossom oil, neroli oil, orange peel oil and sandalwood oil.

Other traditional perfume substances that may be used within the scope of the present invention include, for example, the essential oils such as *angelica* root oil, anise oil, *arnica* blossom oil, sweet basil oil, bay oil, champaca blossom oil, silver fir oil, fir cone oil, elemi oil, *eucalyptus* oil, fennel oil, spruce needle oil, *galbanum* oil, geranium oil, ginger grass oil, guaiac wood oil, gurjun balsam oil, helichrysum oil, ho oil, ginger oil, iris oil, cajeput oil, calamus oil, chamomile oil, camphor oil, canaga oil, cardamom oil, *cassia* oil, pine needle oil, copaiba balsam oil, coriander oil, spearmint oil, caraway oil, cumin oil, lavender oil, lemon grass oil, lime oil, mandarin oil, lemon balm oil, ambrette seed oil, myrrh oil, clove oil, neroli oil, niaouli oil, olibanum oil, *origanum* oil, palmarosa oil, patchouli oil, Peru balsam oil, petitgrain oil, pepper oil, peppermint oil, allspice oil, pine oil, rose oil, rosemary oil, sandalwood oil, celery seed oil, spike lavender oil, star anise oil, turpentine oil, *thuja* oil, thyme oil, *verbena* oil, vetiver oil, juniper berry oil, vermouth oil, wintergreen oil, ylang-ylang oil, ysop oil, cinnamon oil, cinnamon leaf oil, citronella oil, lemon oil and cypress oil as well as compounds selected from the group of ambrettolide, ambroxan, α-amylcinnamaldehyde, anethole, anise aldehyde, anise alcohol, anisole, anthranilic acid methyl ester, acetophenone, benzylacetone, benzaldehyde, benzoic acid ethyl ester, benzophenone, benzyl alcohol, benzyl acetate, benzyl benzoate, benzyl formate, benzyl valerate, borneol, bornyl acetate, boisambrene forte, α-bromostyrene, damascone, damascenone, n-decylaldehyde, n-dodecylaldehyde, eugenol, eugenol methyl ether, eucalyptol, farnesol, fenchone, fenchyl acetate, geranyl acetate, geranyl formate, heliotropin, heptin carboxylic acid methyl ester, heptaldehyde, hydroquinone dimethyl ester, hydroxycinnamyl aldehyde, hydroxycinnamyl alcohol, indole, iron, isoeugenol, isoeugenol methyl ether, isosafrol, jasmine, camphor, carvacrol, carbon, p-cresol methyl ether, coumarin, p-methoxyacetophenone, methyl-n-amyl ketone, methyl anthranilic acid methyl ester, p-methylacetophenone, methyl chavicol, p-methylquinoline, methyl β-naphthyl ketone, methyl n-nonylaldehyde, nonyl alcohol, n-octylaldehyde, p-oxyacetphenone, pentadecanolide, β-phenylethyl alcohol, phenylacetaldehyde-dimethylacetal, phenylacetic acid, pulegon, safrole, salicylic acid isoamyl ester, salicylic acid methyl ester, salicylic acid hexyl ester, salicylic acid cyclohexyl ester, santalol, sandelice, skatol, terpineol, thyme, thymol, troenan, γ-undelactone, vanillin, veratrum aldehyde, cinnamyl aldehyde, cinnamyl alcohol, cinnamic acid, cinnamic acid ethyl ester, cinnamic acid benzyl ester, diphenyl oxide, limonene, linalool, linayl acetate and linalyl propionate, melusat, menthol, menthone, methyl-n-heptenone, pinene, phenyl acetaldehyde, terpinyl acetate, citral, citronellal and mixtures thereof.

In a preferred embodiment, the at least one perfume component is contained in the composition in an amount of from 0.01 to 20 wt.-%, more preferably in an amount of from 0.1 to 5 wt.-%, based on the total weight of the composition. The amount refers to the total amount of perfume components in the composition.

In addition to the afore-mentioned components and different therefrom, the composition may comprise adjunct detergent ingredients. Suitable adjunct detergent ingredients, include but are not limited to: bleaches, in particular a source of peroxygen such as percarbonate salts and/or perborate salts, preferred is sodium percarbonate; bleach activators such as tetraacetyl ethylene diamine, oxybenzene sulphonate bleach activators, such as nonanoyl oxybenzene sulphonate, caprolactam bleach activators, imide bleach activators such as N-nonanoyl-N-methyl acetamide, preformed peracids such as N,N-pthaloylamino peroxycaproic acid, nonylamido peroxyadipic acid or dibenzoyl peroxide; polymeric carboxylates, preferably copolymers of maleic acid and acrylic acid and salts thereof; suds suppressing systems such as silicone based suds suppressors; fluorescent whitening agents; photobleaches; fabric-softening agents such as clay, silicone and/or quaternary ammonium compounds; flocculants such as polyethylene oxide; dye transfer inhibitors such as polyvinylpyrrolidone, poly 4-vinylpyridine N-oxide and/or co-polymer of vinylpyrrolidone and vinylimidazole; fabric integrity components such as hydrophobically modified cellulose and oligomers produced by the condensation of imidazole and epichlorhydrin; soil dispersants; anti-redeposition components such as carboxymethyl cellulose and polyesters; sulphamic acid or salts thereof; citric acid or salts thereof as well as other organic builders; inorganic builders, including carbonate salts, such as sodium carbonate, sodium bicarbonate and mixtures thereof, aluminosilicate builders, such as zeolites, in particular zeolite A, zeolite X, zeolite P and zeolite MAP, silicate salts, preferably sodium silicate; dyes such as orange dye, blue dye, green dye, purple dye, pink dye, or any mixture thereof; and further complexing agents, such as phosphonates, including those based on hydroxyl alkanes, amino alkanes or amino acids, such as 1-hydroxyethane-1,1-diphosphonate (HEDP), ethylenediamine tetramethylene phosphonate (EDTMP), diethylenetriaminepentamethylene phosphonate (DTPMP), and lysine tetramethylene phosphonate (LTMP); sodium sulfate; enzyme stabilizers, including protease inhibitors; mineral oil; organic solvents, including monoalcohols, glycerol and propylene glycol; antibacterial and antimicrobial substances; antioxidants; preservatives; bittering agents, and water.

These adjunct ingredients may be contained in the composition in amounts of from 0.01 to 50 wt.-%, preferably in amounts of from 0.01 to 20 wt.-%, more preferably in amounts of from 0.01 to 15 wt.-%, more preferably in amounts of from 0.1 to 10 wt.-%, most preferably in amounts of from 0.1 to 5 wt.-%, based on the total weight of the composition.

In various embodiments, the adjunct detergent ingredients are selected from glycerol, propylene glycol, phosphonate, citric acid, other complexing agents, mineral oil, enzyme stabilizers, preservatives, water, and combinations thereof, more preferably, from mineral oil, organic solvents, preservatives, and water.

The composition may, in various embodiments, comprises mineral oil in amounts of 0.01 to 20% by weight, preferably 0.1 to 5% by weight, relative to the total weight of the dried laundry sheet.

In a preferred embodiment, preservatives are contained in the composition in an amount of from 0.001 to 10 wt.-%, preferably in amounts of from 0.1 to 5 wt.-%, based on the total weight of the composition.

The solvent content, with the exception of water, may range from 0 to 15% by weight, preferably from 0.3 to 10% by weight, relative to the total weight of the dried laundry sheet.

In a preferred embodiment, the laundry detergent sheet according to the invention contains up to 10 wt.-% of water, more preferably up to 5 wt.-% of water, based on the total weight sheet.

In various embodiments, the laundry detergent compositions are phosphate-free, i.e. comprise less than 1 wt.-% phosphate builder and preferably are free from phosphate builders. The term “phosphate-free”, as used herein, does not relate to phosphonates.

In various embodiments of the inventive methods, the applying step (ii) comprises moving at least a portion of said surface in a rising direction, contacting the rising portion of said surface with said composition and allowing excess composition to drain off said rising portion of said surface in a direction opposite the rising direction. Said movable surface may preferably be a conveyor, with said rising portion of said conveyor being curved or, in alternative embodiments, non-curved. In preferred embodiments, said movable surface is a cylinder rotatable about a horizontal axis with said rising portion on one side and a descending portion on the other side. In all of the afore-mentioned embodiments, said surface may preferably be heated.

The methods of the invention may be carried out in a continuous manufacturing process.

In the methods of the invention, the application in step (ii) may be performed via extrusion or spraying.

The drying step (iii) of the method may be an active drying step. Typically, drying is carried out at elevated temperatures, such as from about 70 to about 90° C., preferably in the range of 75 to 85° C. The drying is carried out for a suitable period of time that allows to control the amount of residual in the laundry detergent sheet. Suitable drying times may range from 0.1 seconds to 5 minutes, preferably 1 second to 1 minute.

Depending on the drying conditions, the laundry detergent sheet obtained in step (iii) may contain residual amounts of water. In various embodiments it is preferred that it contains up to 10 wt.-% of water, preferably up to 5 wt.-% of water, based on the total weight of the laundry detergent sheet.

The laundry detergent sheet provides a detergent composition in a form and shape suitable for use in a washing process. The laundry detergent sheet may preferably be a unit dose form that allows simple dosing of the detergent by the consumer. Preferred applications are in textile laundry applications, more preferably in automatic washing machines, such as front loaders or top loaders commonly used by consumers. When in contact with a sufficient amount of water, like in conventional automatic washing machines and typical laundry applications, the laundry detergent sheet dissolves in the water and forms the washing liquor.

The dimensions of the laundry detergent sheet are selected such that the desired ease of handling, dosage and solubility are ensured. As a consequence, the thickness of the sheet preferably ranges from 0.1 mm to 2.5 mm, preferably from 0.25 mm to 1.5 mm, more preferably from 0.7 to 0.9 mm. Thicker sheets may not completely dissolved in a common washing cycle. Thinner sheets might not be robust enough and show cracks after storage which is undesirable due to reduced consumer acceptance. The length and breadth of the sheet are preferably in the range of from 5 cm×5 cm to 40 cm×40 cm, more preferably about 25 cm× about 12 cm. It will, however, be appreciated that any other suitable dimensions may be used.

The laundry detergent sheet is preferably formed to a mass per unit area of 40 to 200 g/$m^2$, 40 to 80 g/$m^2$, 55 to 75 g/$m^2$, or 60 to 75 g/$m^2$. The mass per unit area can be determined according to ISO 9073-1 (of the year 1989). The sheet according to the invention typically has a total weight of from 0.1 to 90 g, more preferably of from 1 to 10 g.

The sheet is water-soluble. "Water-soluble", as used in this context, means that the sheet when placed into 2 liters of 20° C. deionized water is dissolved to an extent of at least 80 wt.-%, preferably to at least 90 wt.-% more preferably completely, i.e. 100%, after 2 minutes, preferably 1 minute, more preferably 30 seconds. Completely dissolved, as used in this context, means that no residual solids remain visible with the naked eye.

Preferably, the sheet according to the invention dissolves within 0.1 seconds to 60 minutes when the sheet is in contact with water, preferably within a normal washing cycle of an automatic washing machine.

In various embodiments, the laundry detergent sheet obtained in step (iii) is dissolvable in a washing process, preferably in 0.1 seconds to 60 minutes and/or has dimensions of from 5 cm×5 cm to 40 cm×40 cm, more preferably 25 cm×12 cm, and/or has a total weight of from 0.1 to 90 g, preferably of from 1 to 10 g, and/or has a thickness of 0.1 to 2.5 mm, preferably 0.25 to 1.5 mm, more preferably 0.7 to 0.9 mm.

In preferred embodiments, the sheet according to the invention is in unit dose form. The sheet may be designed such that it can directly be placed in the automatic washing machine, preferably the drum, such that it comes into contact with the textiles to be cleaned during the washing process. While its use may be combined with additional adjunct detergent ingredients, it can be preferred that the laundry detergent sheet of the invention is sufficient for textile cleaning, i.e. no further treatment of the textiles before or after the washing process is necessary.

Devices suitable for carrying out the method of the present invention are disclosed in US 2015/0218497 A1. Furthermore, all process steps described in US 2015/0218497 A1 can be similarly applied in the methods of the present invention. For example, in a preferred embodiment of the present invention, the composition is provided in form of a first shelf-stable solution and a second non-shelf-stable solution. A person skilled in the art is routinely aware of how to prepare such solutions and which components can be employed in the respective solutions.

Preferably, the components (a) to (c) and optionally the components (d) and (f) of the composition are mixed with water to form a homogeneous liquid composition, before they are applied to the surface. Any conventional mixing methods of the art that are known for these purposes are suitable and can be employed.

"Liquid composition", as used herein, includes compositions which are fluid or flowable at standard conditions (20° C., 1013 mbar) but also comprises gel-like and paste-like compositions. In particular, non-Newtonian liquids, for example those have a yield point, are also encompassed by this term.

The water content of liquid compositions, as used herein, may be measured by Karl Fischer titration (Angewandte Chemie 1935, 48, 394-396; ISBN 3-540-12846-8 Eugen Scholz).

Preferably, the liquid composition has a viscosity of 50 to 100,000 mPa's at 20° C., more preferably of 1,000 to 50,000 mPa's at 20° C., preferably measured with a Brookfield viscometer (Brookfield DI-I Prime, spindle 3, 10 rpm).

In a preferred embodiment, the liquid composition has a water content of 0.1 to 95 wt.-%, preferably 10 to 80 wt.-%, and particularly 25 to 70 wt.-%, based on the total weight of the liquid composition. In case of a gel or paste, the water content can also be lower and can be 30 wt.-% or less, preferably 20 wt.-% or less, particularly 15 wt.-% or less.

In a preferred embodiment, the obtained sheet contains up to 10 wt.-% of water, more preferably up to 5 wt.-% water, based on the total weight of the sheet.

After manufacturing, the sheet can be packaged into a suitable packaging, which may be a paper or plastic package, preferably a plastic package. More preferably the package does not allow water to enter the package. Also suitable are polymeric water-soluble films.

The invention also relates to methods for cleaning textiles in which the laundry detergent sheets described herein are used as well as the use of the sheets according to the invention for cleaning textiles. In the course of these methods and uses, the textiles to be cleaned are contacted with the laundry detergent sheet according to the invention or the washing liquor produced by dissolving said sheet in water, preferably in a washing process.

In these applications, the laundry detergent sheet according to the invention is preferably in a single unit dose form for use in one washing cycle.

In the claimed methods and uses, the textiles to be cleaned and the laundry detergent sheet according to the invention are preferably placed in the drum of an automatic washing machine and the washing cycle is started, preferably without the addition of a further washing detergent. During the washing process, the sheet comes into contact with water and dissolves therein to form the washing liquor. In various embodiments, the sheets described herein provide for an improved washing performance, in particular on oily, enzyme-sensitive and/or bleachable stains.

The invention is further illustrated by the following examples without being limited thereto.

EXAMPLES

Example 1

The components are mixed to provide the aqueous liquid composition whichsubsequentlyn is applied to a heated cylinder. The cylinder is rotated with a suitable velocity, so that the composition dries by evaporating water and thus forms the laundry detergent sheet. The dried sheet is then cut into suitable pieces for use as a unit dose.

Example 2

Textiles were washed several times with the obtained laundry detergent sheet. Subsequently the textile sensory quality, in particular the sofiness of the surface, was evaluated by subjects comparing a standard against a sample washed with polymer-containing composition or via a Phabrometer®.

What is claimed is:

1. A method for manufacturing a water-soluble laundry detergent sheet, the method comprising:
  providing a liquid composition comprising:
    at least one acrylamide polymer present in an amount of from 0.1 to 20 wt. %, based on the total weight of the liquid composition;
    at least one surfactant that is different from the at least one acrylamide polymer;
    at least one water-soluble polymer that is different from the at least one acrylamide polymer; and
    at least one washing booster that is different from the at least one acrylamide polymer;
  moving at least a portion of a heated surface in a first direction relative to the liquid composition to form a layer of the liquid composition on the heated surface;
  draining any excess amount of the liquid composition from the heated surface in a second direction that is opposite to the first direction;
  drying the layer at a temperature of from 70° C. to 90° C. for a time period of from 1 second to 60 seconds to obtain a laundry detergent sheet;
  cutting the laundry detergent sheet into one or more pieces of a predetermined shape and size suitable for use as a unit dose; and
  packaging the one or more laundry detergent sheet pieces, wherein:
    the at least one acrylamide polymer is selected from the group consisting of 2-propionic acid polymer with 2-propenamide, minimum number average molecular weight (in amu) 18,000 or N,N-dimethyl-N-2-propenyl-2-propene-1-aminium chloride (dimethyl diallyl ammonium chloride), 2-propenamide polymer with N,N,N-trimethyl-3-[(1-oxo-2-propenyl) amino]-1-propanaminium chloride ((3-acrylamidopropyl)trimethylammonium chloride), and a polymer with sodium 2-propenoate, and
    the laundry detergent sheet has a mass per unit area of from 40 to 200 g/m$^2$, determined according to ISO 9073-1.

2. The method of claim 1, wherein the at least one surfactant is:
  (1) selected from the group consisting of anionic surfactants, cationic surfactants, non-ionic surfactants, amphoteric surfactants, and any combination thereof; and/or
  (2) in an amount of from 10 to 90 wt. % based on the total weight of the liquid composition.

3. The method of claim 1, wherein the at least one water-soluble polymer is:
  (1) selected from the group consisting of polyvinyl alcohol (PVA), polyethylene glycol (PEG), starch, cellulose, pullulan, xanthan, guar, carrageenan, polyacrylate, gelatin, and any combination thereof; and/or
  (2) present in an amount of from 1 to 80 wt. % based on the total weight of the liquid composition.

4. The method of claim 3, wherein the at least one water-soluble polymer comprises polyvinyl alcohol and starch.

5. The method of claim 1, wherein the at least one washing booster comprises at least one enzyme, at least one polyalkyleneimine, or a combination thereof.

6. The method of claim 5, wherein the at least one enzyme is present in an amount from 0.0001 to 10 wt. %, based on the total weight of the liquid composition.

7. The method of claim 5, wherein the at least one washing booster comprises at least one polyethyleneimine or alkoxylated variant thereof.

8. The method of claim 7, wherein the at least one washing booster is present in an amount of from 0.01 to 40 wt. %, based on the total weight of the liquid composition.

9. The method of claim 1, wherein the liquid composition further comprises at least one perfume component present in an amount of from 0.01 to 20 wt. %, based on the total weight of the liquid composition.

10. The method of claim 1, wherein the liquid composition further comprises at least one adjunct detergent ingredient that is:
  (1) selected from the group consisting of bleaches, bleach activators, polymeric carboxylates, suds suppressing systems, fluorescent whitening agents, photobleaches, fabric-softening agents, flocculants, dye transfer inhibitors, fabric integrity components, soil dispersants, soil anti-redeposition aids, anti-redeposition components, sulphamic acid or salts thereof, citric acid or salts thereof, organic builders, inorganic builders, dyes, complexing agents, sodium sulfate, enzyme stabilizers, mineral oil, organic solvents, antibacterial substances, antimicrobial substances, antioxidants, preservatives, bittering agents, water, and any combination thereof; and/or
  (2) in an amount of from 0.01 to 50 wt. %, based on the total weight of the liquid composition.

11. The method of claim 1, wherein the laundry detergent sheet comprises up to 10 wt. % of water, based on the total weight of the laundry detergent sheet.

12. The method of claim 1, wherein the laundry detergent sheet:
  is dissolvable in a washing process;
  has dimensions of from 5 cm×5 cm to 40 cm×40 cm;
  has a total weight from 0.1 to 90 g; and/or
  has a thickness of from 0.1 to 2.5 mm.

13. The method of claim 1, wherein: the at least portion of the heated surface is curved or non-curved.

14. The method of claim 1, wherein the laundry detergent sheet has a mass per unit area of from 60 to 75 g/m$^2$, determined according to ISO 9073-1.

15. The method of claim 1, wherein the layer is dried at a temperature of from 75° C. to 85° C.

16. A method for manufacturing a water-soluble laundry detergent sheet, the method comprising:
  providing a liquid composition comprising:
    at least one acrylamide polymer that is 2-propenamide polymer with N,N,N-trimethyl-3-[(1-oxo-2-propenyl) amino]-1-propanaminium chloride ((3-acrylamidopropyl)trimethylammonium chloride) in an amount of from 0.1 to 20 wt. %, based on the total weight of the liquid composition;
    at least one surfactant selected from the group consisting of alkyl benzene sulfonates, alkyl ether sulfates, $C_8$-18 alkyl alkyloxylated alcohols, and any combination thereof;
    at least one water-soluble polymer comprising polyvinyl alcohol and starch; and
    at least one washing booster selected from the group consisting of mannase, xanthanase, licheninase, an ethoxylated polyethyleneimine, and any combination thereof;

moving at least a portion of a heated surface in a first direction relative to the liquid composition to form a layer of the liquid composition on the heated surface;

draining any excess amount of the liquid composition from the heated surface in a second direction that is opposite to the first direction;

drying the layer at a temperature of from 70° C. to 90° C. for a time period of from 1 second to 60 seconds to obtain a laundry detergent sheet;

cutting the laundry detergent sheet into one or more pieces of a predetermined shape and size suitable for use as a unit dose; and packaging the one or more laundry detergent sheet pieces, wherein the laundry detergent sheet has a mass per unit area of from 40 to 200 $g/m^2$, determined according to ISO 9073-1.

17. The method of claim 16, wherein the laundry detergent sheet has a mass per unit area of from 60 to 75 $g/m^2$, determined according to ISO 9073-1.

18. The method of claim 16, wherein the layer is dried at a temperature of from 75° C. to 85° C.

* * * * *